(12) United States Patent
Ajila et al.

(10) Patent No.: US 12,481,528 B2
(45) Date of Patent: Nov. 25, 2025

(54) HYBRID VIRTUAL THREAD CONTEXT SWITCHING MECHANISM

(71) Applicant: International Business Machines Corporation, Armonk, NY (US)

(72) Inventors: Oluwatobi Ajila, Ottawa (CA); Siwei Lu, Ottawa (CA); Graham Alan Chapman, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 18/328,222

(22) Filed: Jun. 2, 2023

(65) Prior Publication Data
US 2024/0403109 A1    Dec. 5, 2024

(51) Int. Cl.
G06F 9/48      (2006.01)
G06F 9/455    (2018.01)
G06F 9/50      (2006.01)
G06F 12/08    (2016.01)

(52) U.S. Cl.
CPC ........ *G06F 9/4881* (2013.01); *G06F 9/45533* (2013.01); *G06F 12/08* (2013.01); *G06F 9/5016* (2013.01)

(58) Field of Classification Search
None
See application file for complete search history.

(56) References Cited

U.S. PATENT DOCUMENTS

| | | | | |
|---|---|---|---|---|
| 5,727,178 | A * | 3/1998 | Pletcher | G06F 9/5016 711/170 |
| 7,669,203 | B2 | 2/2010 | Samra et al. | |
| 8,868,887 | B2 | 10/2014 | Wang et al. | |
| 2005/0132363 | A1* | 6/2005 | Tewari | G06F 9/45558 718/1 |
| 2006/0026407 | A1* | 2/2006 | Chauvel | G06F 9/30174 712/228 |
| 2012/0151487 | A1 | 6/2012 | Frank et al. | |
| 2013/0227254 | A1* | 8/2013 | McCallum | G06F 9/485 712/228 |

(Continued)

OTHER PUBLICATIONS

Bien, "Taking a look at Virtual Threads (Project Loom)", May 22, 2022, pp. 1-4, accessed May 15, 2023, https://mbien.dev/blog/entry/taking-a-look-at-virtual.

(Continued)

*Primary Examiner* — Lewis A Bullock, Jr.
*Assistant Examiner* — John Robert Dakita Ewald
(74) *Attorney, Agent, or Firm* — Yee & Associates, P.C.

(57) ABSTRACT

Hybrid virtual thread context switching in virtual machines is provided. For virtual threads scheduled to run on a VM, it is determined whether a virtual thread requires a stack. If a stack is required, it is determined whether low memory has space to allocate a stack. If there is space, a stack in low memory is allocated. If not, unused stacks are copied from low to high memory. If the virtual thread does not require a stack, it is determined whether the virtual thread stack is in low memory. If it is not, it is copied from high memory if there is enough space in low memory. If there is not enough space, unused stacks are copied from low memory to high memory. If the stack is in low memory, the method performs a stack switch and schedules the virtual on a carrier thread of the VM.

20 Claims, 7 Drawing Sheets

(56) References Cited

U.S. PATENT DOCUMENTS

2021/0397549 A1* 12/2021 Pressler ................ G06F 9/4843

OTHER PUBLICATIONS

Shubham, "Growable Array Based Stack", Jul. 29, 2022, pp. 1-15, accessed May 15, 2023, https://www.geeksforgeeks.org/growable-array-based-stack/.

Unknown, "Thread State and the Global Interpreter Lock", Python/C API Reference Manual, pp. 1-4, accessed May 15, 2023, https://sceweb.sce.uhcl.edu/helm/WEBPAGE-Python/documentation/python_tutorial/api/threads.html.

Yoon et al., "Virtual Thread: Maximizing Thread-Level Parallelism beyond GPU Scheduling Limit", 2016 ACM/IEEE 43rd Annual International Symposium on Computer Architecture, Jun. 2016, pp. 609-621, accessed May 15, 2023, https://dl.acm.org/doi/10.1109/ISCA.2016.59.

* cited by examiner

HYBRID VIRTUAL THREAD CONTEXT SWITCHING MECHANISM

BACKGROUND

The present disclosure relates generally to an improved computing system, and more specifically to scheduling virtual threads in a virtual machine.

Context switching is used by operating systems and programming languages to allow multiple threads to execute concurrently on a single central processing unit (CPU) or processor core. Context switching saves the current state of a running thread and restoring the saved state of a different thread so that it can continue execution. When a thread is blocked or waiting for a resource, the operating system can switch to a different thread that is ready to execute, thereby improving system performance and resource utilization. Context switching is typically managed by a runtime library or operating system kernel.

SUMMARY

An illustrative embodiment provides a computer-implemented method for hybrid virtual thread context switching in virtual machines. The method comprises, responsive to preparation of scheduling a number of virtual threads to run on a virtual machine on a host system, determining whether a virtual thread requires a stack. If the virtual thread requires a stack, the method determines whether low memory has enough space to allocate a stack. If low memory has enough space, a stack in low memory is allocated to the virtual thread. If there is not enough space in low memory, at least one unused stack is copied from low memory to high memory to make room. If the virtual thread does not require a stack, it is determined whether the virtual thread stack is in low memory. If the virtual thread stack is not in low memory, the method copies it from high memory if there is enough space in low memory. If there is not enough space in low memory, the method copies unused stacks from low memory to high memory to make room. If the virtual thread stack is in low memory, the method performs a stack switch for the virtual thread and schedules it on a carrier thread of the virtual machine. According to other illustrative embodiments, a computer system, and a computer program product for hybrid virtual thread context switching are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
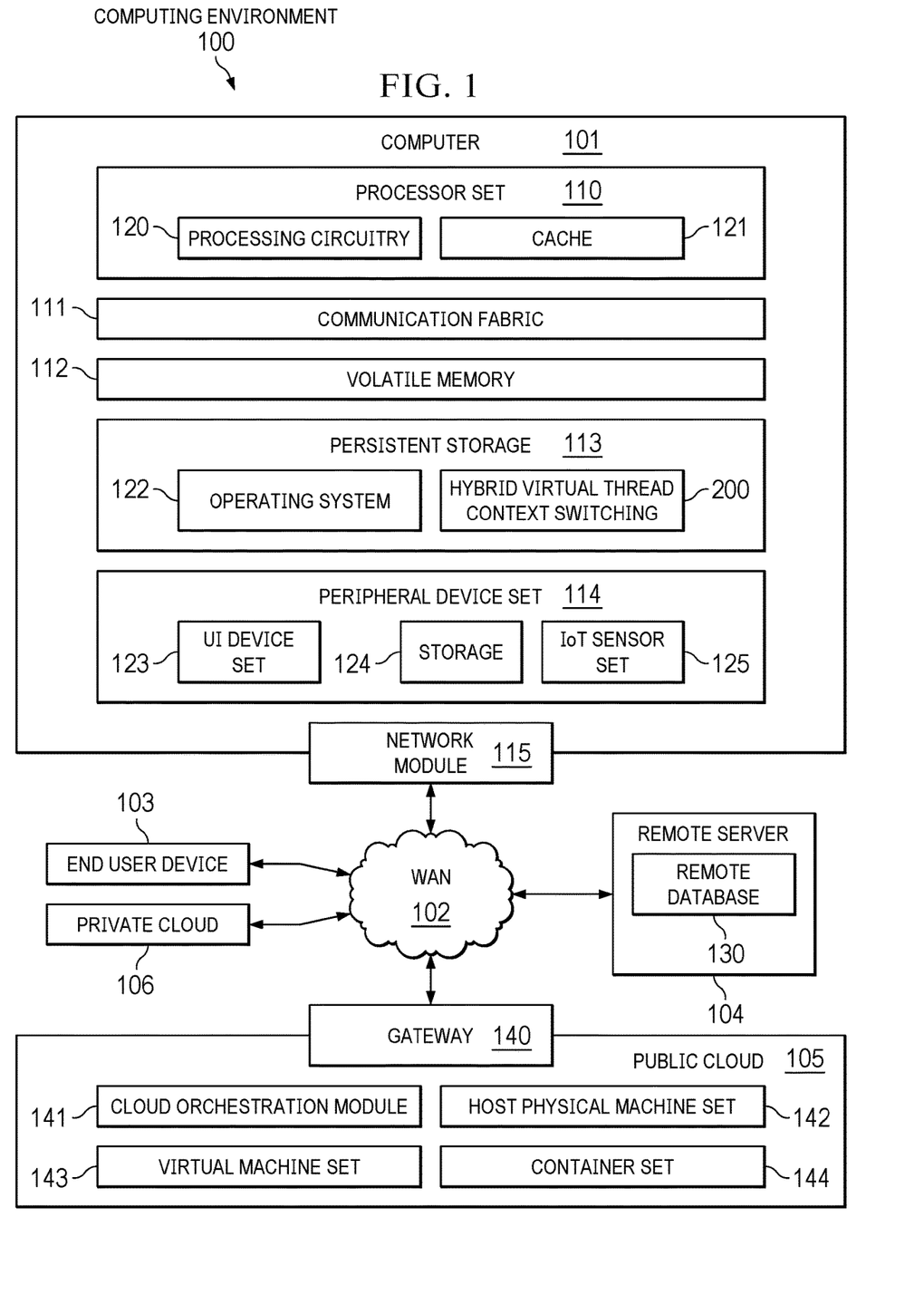
FIG. 1 depicts a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as hybrid virtual thread context switching 200. In addition to hybrid virtual thread context switching 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and hybrid virtual thread context switching 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in hybrid virtual thread context switching 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Hybrid virtual thread context switching instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that Java has a one-to-one mapping with kernel threads. Kernel threads are expensive in terms of time and resources to allocation, and the kernel can only reasonably support on the order of thousands of threads. As a result, asynchronous programming patterns have become the norm in Java, Javascript, Kotlin, and similar programming languages. However, asynchronous programming patterns are difficult to reason and debug.

The illustrative embodiments also recognize and take into account that Java threads do not necessarily need everything that kernel threads support and do not have much context that needs to be tracked. For example, user threads might be 200-300 bytes versus kernel thread up to 1 MB with 2 kb of metadata.

The illustrative embodiments also recognize and take into account that the Java development kit (JDK) introduces a new threading model called virtual threads (aka green threading, thread fibers, and other names). Virtual threads are lightweight threads comprising a continuation and a user level scheduler. Virtual threads run on carrier threads, which are actual kernel threads of host systems. By default, virtual threads are scheduled by a global scheduler with as many workers as there are CPU core of the host system. Therefore, a large number of virtual threads are scheduled onto a smaller number of carrier threads, known as M: N scheduling (M user-mode threads are scheduled onto N carrier threads, where M>>N). Virtual threads are executed by first mounting them onto carrier threads (i.e., scheduling the virtual threads). When the virtual thread blocks, it is unmounted (de-scheduled) from the carrier thread.

The illustrative embodiments also recognize and take into account that the underlying mechanism for context switching for virtual threads is a continuation (more specifically, a delimited continuation). Practically speaking, the continuation is a mechanism for pausing and resuming thread state, which requires that the continuation is able to capture the thread stack and live variables. One approach for implementing context switching on a virtual thread with the use of continuations is by performing a stack copy, wherein the stack of the virtual thread is copied into a buffer allowing the state of another virtual thread to be copied into the stack memory. This approach also requires that the unmounted stack be walkable in order for the garbage collection (GC) to find live objects. Walking a stack frame comprises inspecting the contents of stack frames of a running program to gather information regarding its execution such as the sequence of function calls, values of function parameters and local variables, and return addresses. To make the unmounted stack walkable, all references can be copied into an object array while supplying a mapping back to the stack original layout. Alternatively, a bulk copy of the entire stack can be performed maintaining the same layout, so it remains walkable. The drawback of this approach is that context switching can be expensive, and the cost grows as the stack gets larger. Furthermore, with mechanisms that serialize the stack into more compact layouts, there are additional costs in encoding and decoding object mappings.

Another approach to context switching for virtual threads is stack switching. This approach is easily performed on language runtimes that support user space thread stacks (i.e., stacks that do not run on native operating system stacks). With stack switching, context switching involves simply switching from one stack to another, which is described in greater detail in association with FIG. 4. The benefit of this approach is that the context switching costs are low and independent of stack size. The drawback of this approach is that it makes it difficult to integrate with optimizations that require low address space. Because this approach involved stack switching, if there is a virtual address space limit there is a hard cap on the number of virtual threads that can be allocated. For example, if the default thread stack size is 1 MB and there are optimizations that require stacks under 4 GB, then there can be a theoretical maximum of 4000 virtual threads at any given time. Realistically, the number would be smaller as it would be unlikely the Java virtual machine (JVM) would be able to acquire the entirety of the low memory address space.

The illustrative embodiments provide hybrid virtual thread context switching wherein the default policy is stack switching, but as the low memory virtual addresses become more scarce, de-scheduled virtual thread stacks are copied out of low address memory to high address memory in the background, thereby freeing up low memory space. Before a de-scheduled virtual thread in high memory can be rescheduled, its stack is first copied into low memory space. Then a stack switch can occur to reschedule it. This approach allows context switching costs to remain low (via stack switched) while maintained existing optimization constrains without the need to adhere to a hard limit on the number of virtual threads that can exist at a given time.

The state switching approach of the illustrative embodiments enables scheduling and de-scheduling virtual threads by simply updating live thread state variables and accounts for on-stack frame metadata (i.e., GP register save areas for transitions between compiled and interpreted code, stack guards for overflow detection, etc.). Scheduling and de-scheduling virtual threads reuses the existing interpreter instance of the carrier thread, thus minimizing native stack usage.

The stack copying approach of the illustrative embodiments performs a bulk copy from high memory to low memory and vice versa. This mechanism ensures that the stack remains walkable in the new location and ensures the integrity of stack allocated objects and Java native interface (JNI) arguments, locals, and frames throughout the process.

Figure 2:
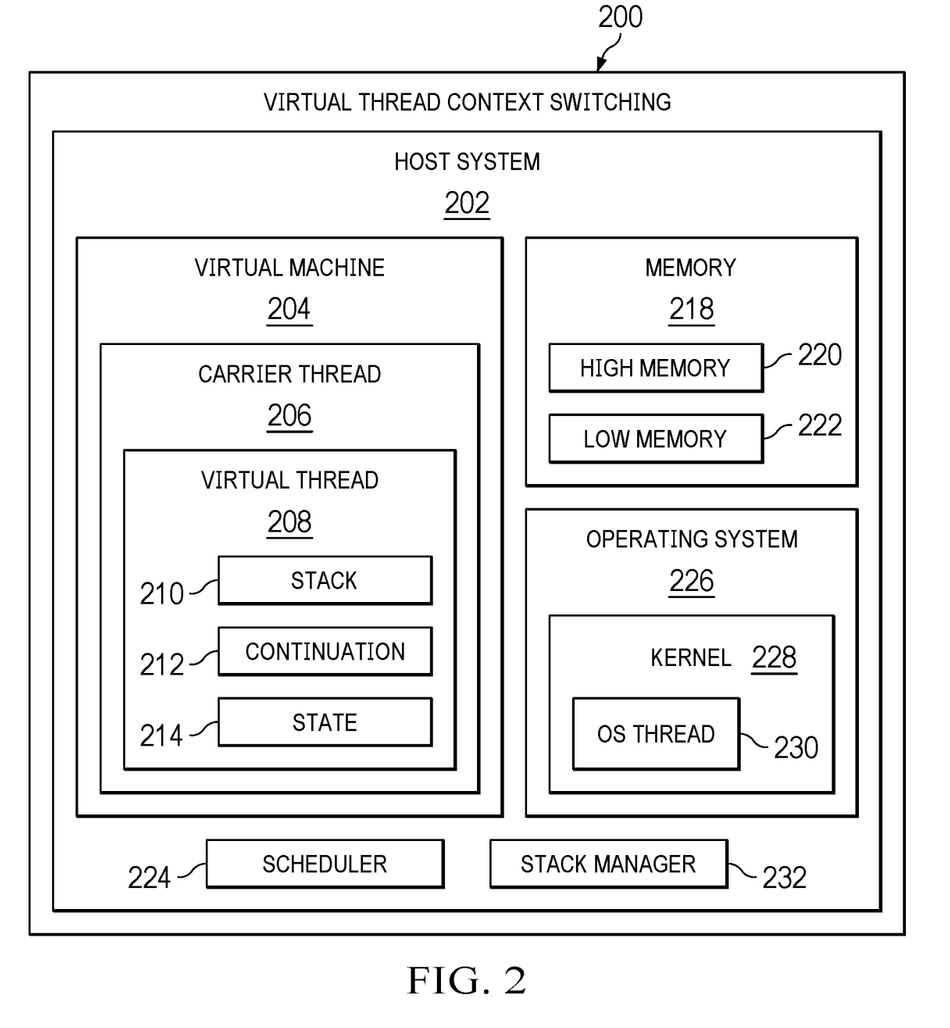
FIG. 2 depicts a block diagram for hybrid virtual thread context switching in accordance with an illustrative embodiment.

FIG. 2 depicts a block diagram for hybrid virtual thread context switching in accordance with an illustrative embodiment. Hybrid virtual thread context switching 200 can be implemented in computing environment 100 in FIG. 1.

Hybrid virtual thread context switching 200 involves a virtual machine 204 running on a host system 202. Virtual machine 204 comprises a software implementation of a computer system capable of running an operating system and executing programs as if it were a physical computer. Virtual machine 204 runs a virtual thread 208 (Java scheduled thread) on a carrier thread 206. Carrier thread 206 is a regular Java thread (platform thread), which is a thread abstraction in the virtual machine 204.

There may be a many-to-few relationship wherein many virtual threads are scheduled on a few carrier threads. Virtual thread is mapped onto carrier thread 206 by a scheduler 224.

Virtual thread 208 comprises stack 210, which is a data structure that keeps track of the virtual thread's method of invocation and local variables. Virtual thread 208 also comprises continuation 212 that allows suspension and resumption of execution of the virtual thread. State 214 specifies what the virtual thread 208 is doing at any given time and what is it eligible to do next.

Carrier thread 206 is associated with an operating system (OS) thread 230 running in the kernel 228 of the operating system 226 on the host system 202. There is a 1-to-1 relationship between the carrier (platform) thread 206 and OS thread 230. Kernel 228 provides essential services to system components such as device drivers, file systems, and user-level applications and manages system resources such memory, CPU, input/output (I/O) devices, etc.

Host system 202 comprises memory 218, which is divided into high memory 220 and low memory 222. High memory 220 is the region of memory 218 that is beyond direct access by the CPU. Low memory 222 is the region of memory 218 that is directly accessible by the CPU and is mapped to the address space of kernel 228.

Stack manager 232 is a daemon thread that tracks usage of address space in low memory 222 and copies virtual thread 208 from low memory 222 to high memory 220 and vice versa according to the need to schedule the virtual thread in question. A virtual thread such as virtual thread 208 only runs when its stack 210 is in low memory 222. If the stack 210 originates in high memory 220, it must first be copied into low memory 222 after which it performs a stack switch to be scheduled on a carrier thread 206. If the stack 210 is already in low memory 222, it simply performs a stack switch to be scheduled on the carrier thread 206.

Stacks are copied from low memory 222 into high memory 220 when low memory runs out of space. If the amount of low memory used by stacks is above a threshold, stack manager 232 copies the stacks in question out of low memory 222 into high memory 220. If there is not enough low memory 222 to allocate a new stack from high memory 220 or move an existing stack from high memory 220 to low memory 222 (i.e., because the virtual thread in question is being scheduled) stack manager 232 copies stacks out of low memory 222 to high memory 220 in order to make room.

Stack manager 232 tracks recently used virtual threads such that virtual threads that are mostly likely to be rescheduled are kept in low memory 222, whereas threads that have not been scheduled beyond a specified amount of time are the first candidates to be copied to high memory 220. Stack manager 232 operates in the background and copies the virtual thread stacks 210, which increases the likelihood a simple stack switch can be performed for any given virtual thread context switch.

Figure 3:
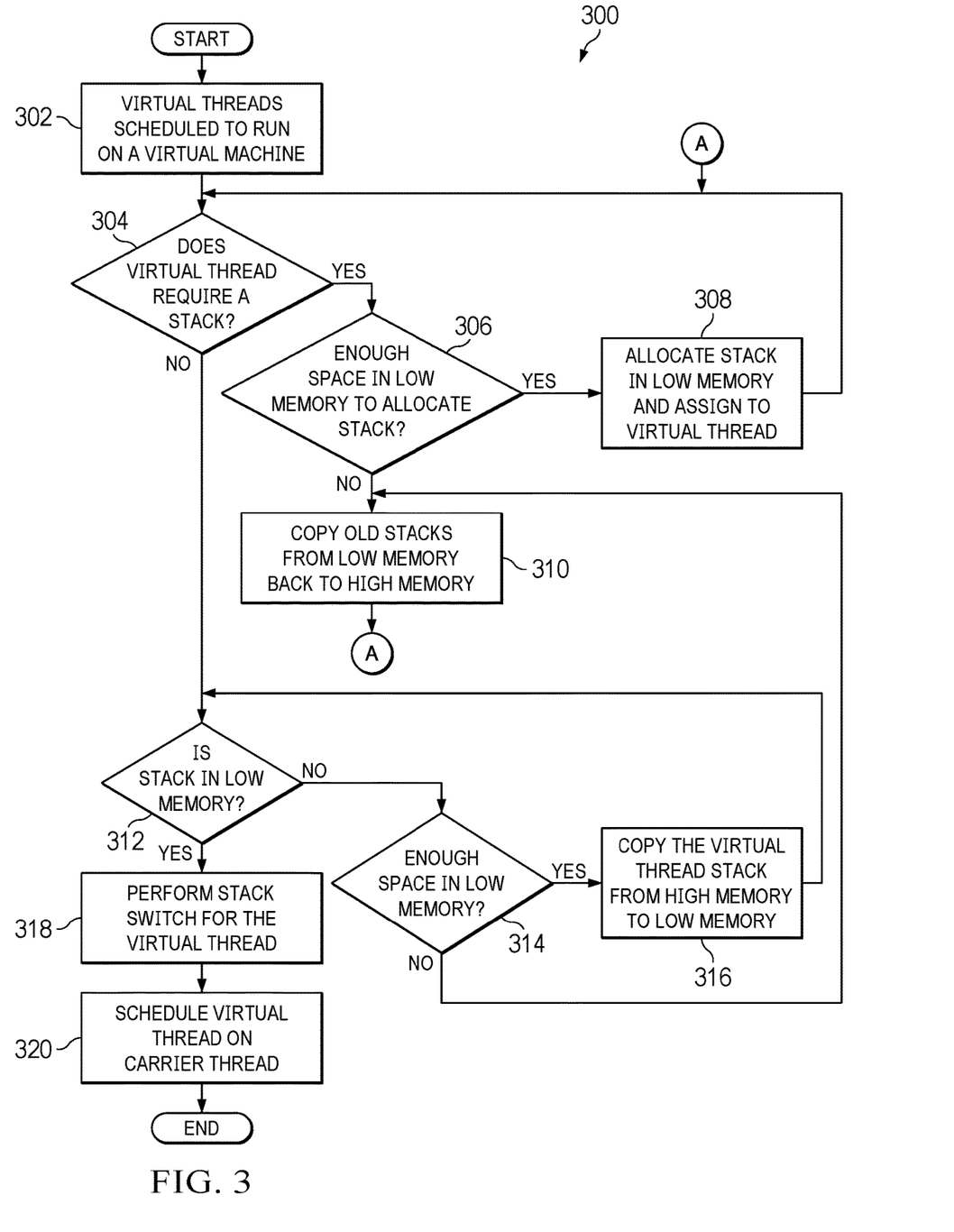
FIG. 3 depicts a flowchart of a process for hybrid virtual thread context switching in virtual machines in accordance with an illustrative embodiment.

FIG. 3 depicts a flowchart of a process for hybrid virtual thread context switching in virtual machines in accordance with an illustrative embodiment. Process 300 can be in computing environment 100 in FIG. 1.

Responsive to preparation of scheduling a number of virtual threads to run on a virtual machine on a host system (step 302), process 300 determines whether a virtual thread requires a stack (step 304). The virtual threads are scheduled at the virtual machine level. Responsive to a determination that the virtual thread requires a stack, process 300 determines whether low memory has enough space to allocate a stack (step 306).

Responsive to a determination that low memory has enough space, process 300 allocates a stack in low memory and assigns it to the virtual thread (step 308) and returns to step 304. Responsive to a determination that low memory does not have enough space, process 300 copies at least one unused stack from low memory to high memory (step 310) and returns to step 304.

Responsive to a determination that the virtual thread does not require a stack, process 300 determines whether the virtual thread stack is in low memory (step 312). Responsive to a determination that the virtual thread stack is not in low memory, process 300 determines whether there is enough space in low memory to copy the virtual thread stack from high memory into low memory (step 314).

Responsive to a determination that there is enough space in low memory to copy the virtual thread stack from the high memory into low memory, process 300 copies the virtual thread stack from high memory to low memory (step 316) and returns to step 312. Responsive to a determination that there is not enough space in low memory to copy the virtual thread stack from high memory into low memory, process 300 copies at least one unused stack from low memory to high memory (step 310) and returns to step 304. Removing unused stacks from low memory might comprise determining ages of all stacks in low memory, and responsive to a determination that any stack in low memory has an age above a predetermined threshold, copying that stack from low memory to high memory.

Responsive to a determination that the virtual thread stack is in low memory, process 300 performing a stack switch for the virtual thread (step 318) and schedules the virtual thread on a carrier thread of the virtual machine (step 320). Process 300 then ends.

Figure 4:
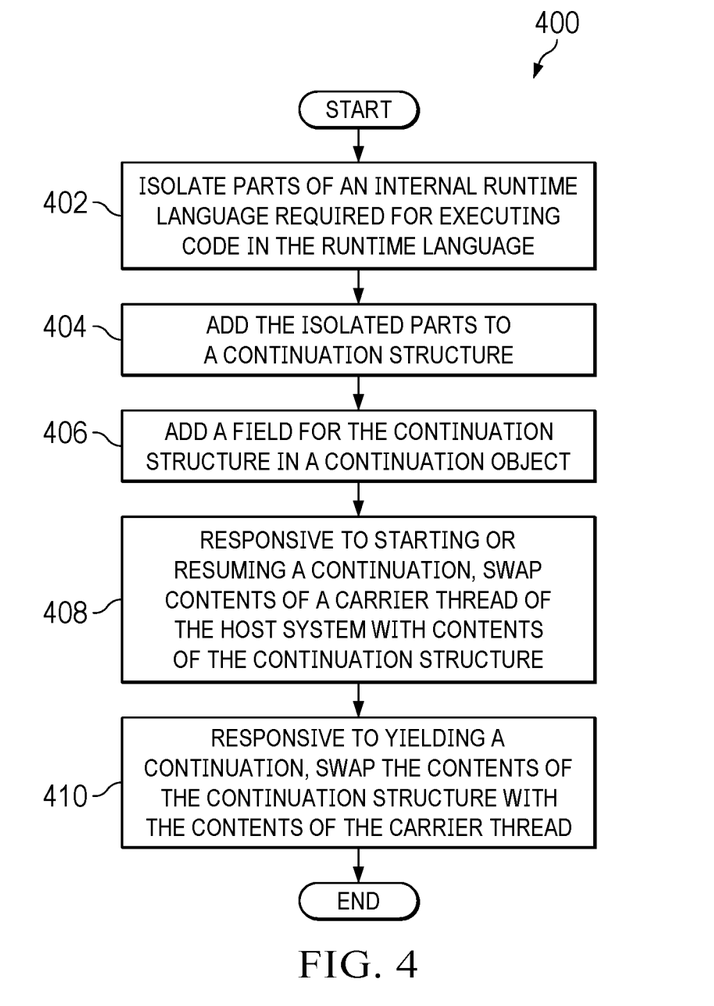
FIG. 4 depicts a flowchart for performing a stack switch in accordance with an illustrative embodiment.

FIG. 4 depicts a flowchart for performing a stack switch in accordance with an illustrative embodiment. Process 400 is a detailed example of step 318 in FIG. 3.

Process 400 begins by isolating parts of an internal runtime language required for executing code in the runtime language (step 402). The isolated parts are added to a continuation structure (step 404), and a field for the continuation structure is added in a continuation object (step 406).

Responsive to starting or resuming a continuation, process 400 swaps the contents of a carrier thread of the host system with contents of the continuation structure (step 408). Responsive to yielding a continuation, process 400 swaps the contents of the continuation structure with the contents of the carrier thread (step 410). Process 400 then ends.

Figure 5:
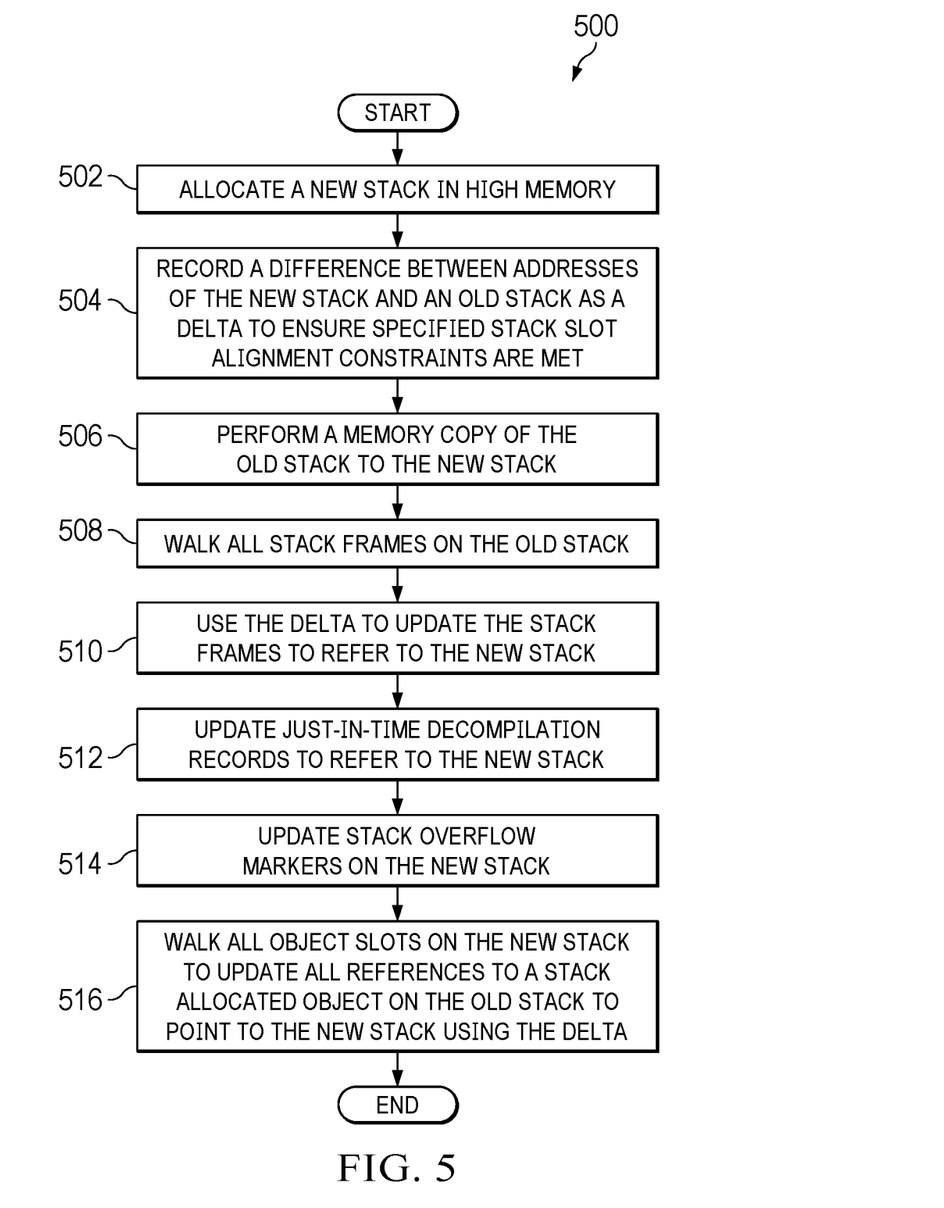
FIG. 5 depicts a flowchart for performing a stack copy in accordance with an illustrative embodiment.

FIG. 5 depicts a flowchart for copying the virtual thread stack from high memory to low memory in accordance with an illustrative embodiment. Process 500 is a detailed example of step 316 in FIG. 3.

Process 500 begins by allocating a new stack in high memory (step 502). Process 500 records the difference between addresses of the new stack and an old stack as a delta to ensure specified stack slot alignment constraints are met (step 504).

Process 500 then performs a memory copy of the old stack to the new stack (step 506) and walks all stack frames on the old stack (step 508). The delta is used to update the stack frames to refer to the new stack (step 510), and just-in-time decompilation records are updated to refer to the new stack (step 512).

Process 500 updates the stack overflow markers on the new stack (step 514) and walks all object slots on the new stack to update all references to a stack allocated object on the old stack to point to the new stack using the delta (step 516). Process 500 then ends.

Figure 6:
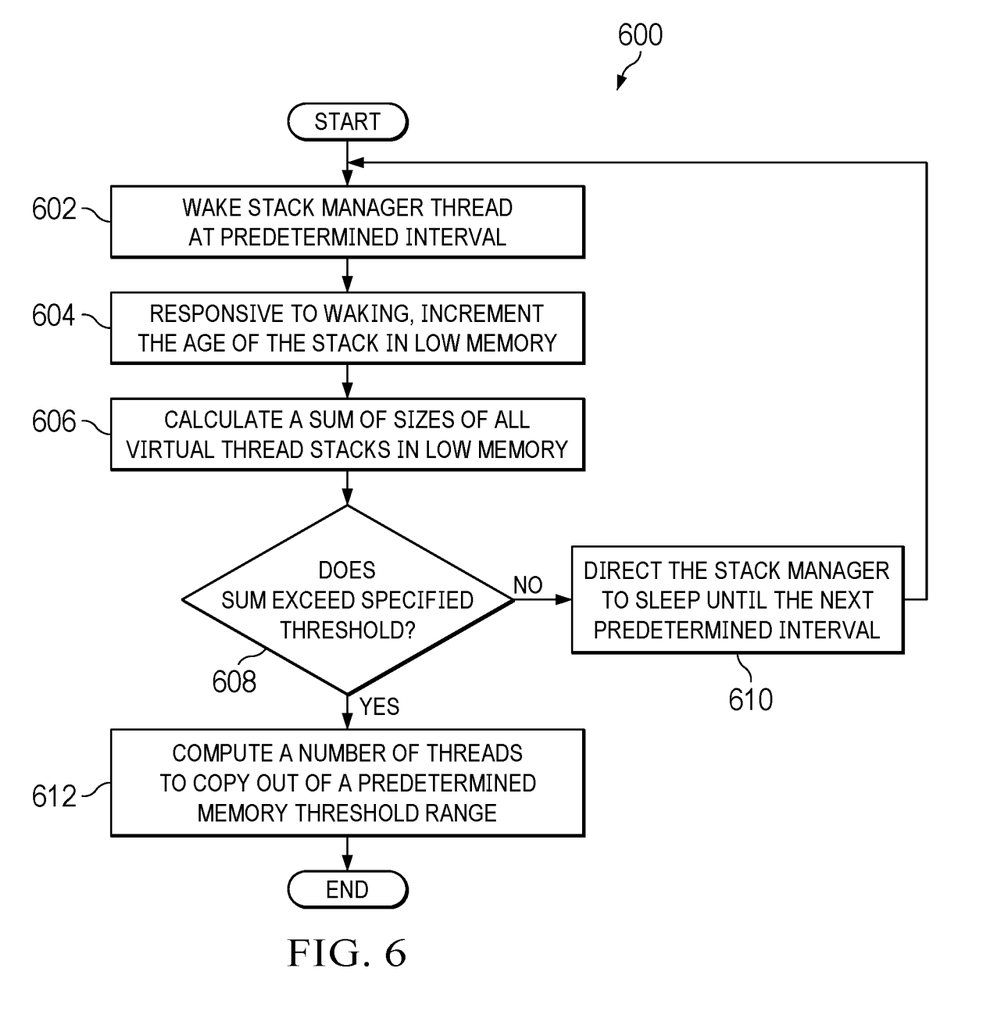
FIG. 6 depicts a flowchart for copying the stack from low memory back to high memory in accordance with an illustrative embodiment.

FIG. 6 depicts a flowchart for copying the stack from low memory back to high memory in accordance with an illustrative embodiment. Process 600 is similar to step 310 but is performed synchronously in the background by the stack manager such as stack manager 232 in FIG. 2.

Process 600 begins by waking a stack manager thread at predetermined intervals (step 602). Responsive to waking, process 600 increments the age of the stack in low memory (step 604).

Process 600 calculates the sum of sizes of all virtual thread stacks in low memory (606) and determines whether the sum exceeds a specified threshold (step 608). Responsive to a determination that the sum is below a specified threshold, process 600 directs the stack manager to sleep until the next predetermined interval (step 610). Responsive to a determination that the sum exceeds the specified threshold, process 600 computes a number of threads to copy out of a predetermined memory threshold range. Process 600 then ends.

Figure 7:
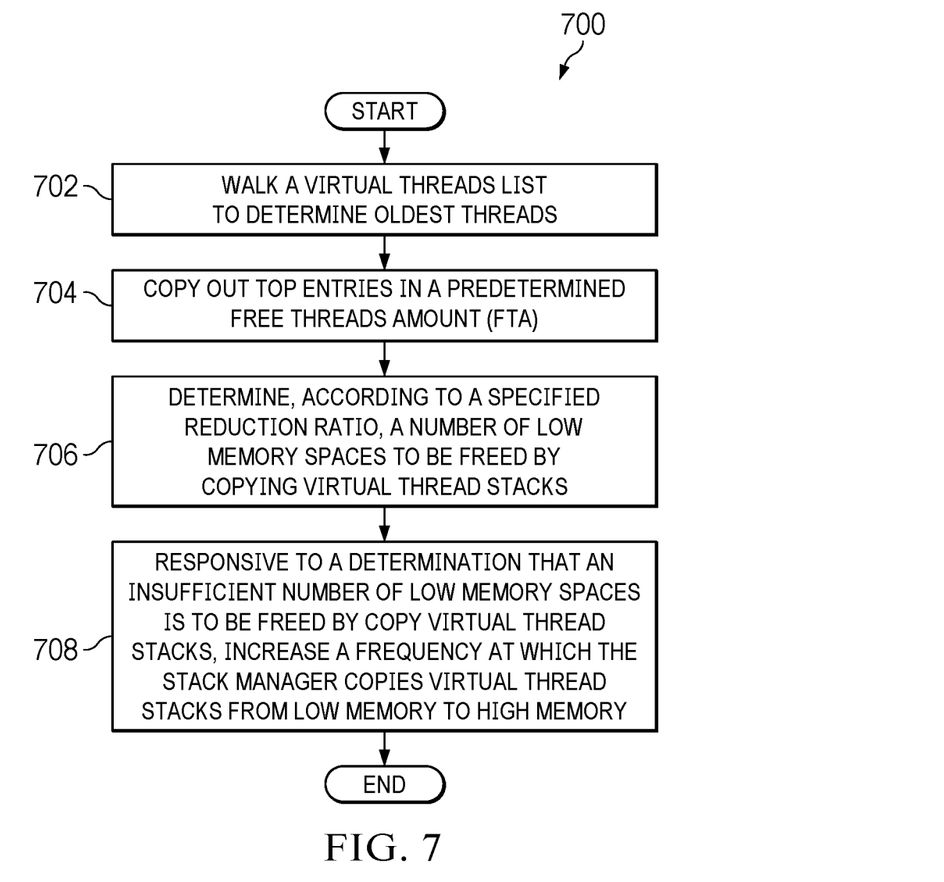
FIG. 7 depicts a flowchart for computing a number of threads to copy out of a predetermined memory threshold range in accordance with an illustrative embodiment.

FIG. 7 depicts a flowchart for computing a number of threads to copy out of a predetermined memory threshold range in accordance with an illustrative embodiment. Process 700 is a detailed example of step 612 in FIG. 6.

Process 700 begins by walking a virtual threads list to determine oldest threads (step 702) and copying out top entries in a predetermined free threads amount (FTA) (step 704). Process 700 determines, according to a specified reduction ratio, a number of low memory spaces to be freed by copying virtual thread stacks (step 706).

Responsive to a determination that an insufficient number of low memory spaces is to be freed by copy virtual thread stacks, process 700 increases the frequency at which the stack manager copies virtual thread stacks from low memory to high memory (step 708). Process 700 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for hybrid virtual thread context switching in virtual machines, the method comprising:
    responsive to preparation of scheduling a number of virtual threads to run on a virtual machine on a host system, determining whether a virtual thread requires a stack;
    responsive to a determination that the virtual thread requires a stack, determining whether low memory has enough space to allocate a stack;
    responsive to a determination that low memory has enough space, allocating a stack in low memory to the virtual thread;
    responsive to a determination that low memory does not have enough space, copying at least one unused stack from low memory to high memory;
    responsive to a determination that the virtual thread does not require a stack, determining whether a virtual thread stack is in low memory;
    responsive to a determination that the virtual thread stack is not in low memory, determining whether there is enough space in low memory to copy the virtual thread stack from high memory into low memory;
    responsive to a determination that there is enough space in low memory to copy the virtual thread stack from the high memory into low memory, copying the virtual thread stack from high memory to low memory;
    responsive to a determination that there is not enough space in low memory to copy the virtual thread stack from high memory into low memory, copying at least one unused stack from low memory to high memory;
    responsive to a determination that the virtual thread stack is in low memory, performing a stack switch for the virtual thread; scheduling the virtual thread on a carrier thread of the virtual machine-; and
    executing the carrier thread of the virtual machine.

2. The method of claim 1, wherein the virtual threads are scheduled at the virtual machine level.

3. The method of claim 1, wherein performing the stack switch comprises:
    isolating parts of an internal runtime language required for executing code in the runtime language;
    adding the isolated parts to a continuation structure;
    adding a field for the continuation structure in a continuation object;
    responsive to starting or resuming a continuation, swapping contents of a carrier thread of the host system with contents of the continuation structure; and
    responsive to yielding a continuation, swapping the contents of the continuation structure with the contents of the carrier thread.

4. The method of claim 1, wherein copying the virtual thread stack from high memory to low memory further comprises:
    allocating a new stack in high memory;
    recording a difference between addresses of the new stack and an old stack as a delta to ensure specified stack slot alignment constraints are met;
    performing a memory copy of the old stack to the new stack;

walking all stack frames on the old stack;
using the delta to update the stack frames to refer to the new stack;
updating just-in-time decompilation records to refer to the new stack;
updating stack overflow markers on the new stack; and
walking all object slots on the new stack to update all references to a stack allocated object on the old stack to point to the new stack using the delta.

5. The method of claim 1, wherein copying the at least one unused stack from low memory to high memory further comprises:
waking a stack manager thread at predetermined intervals;
responsive to waking, incrementing the age of the stack in low memory;
calculating a sum of sizes of all virtual thread stacks in low memory;
responsive to a determination that the sum is below a specified threshold, directing the stack manager to sleep until a next predetermined interval; and
responsive to a determination that the sum exceeds the specified threshold, computing a number of threads to copy out of a predetermined memory threshold range.

6. The method of claim 5, wherein computing the number of threads to copy out of a predetermined memory threshold range further comprises:
walking a virtual threads list to determine oldest threads;
copying out top entries in a predetermined free threads amount;
determining, according to a specified reduction ratio, a number of low memory spaces to be freed by copying virtual thread stacks; and
responsive to a determination that an insufficient number of low memory spaces is to be freed by copy virtual thread stacks, increasing a frequency at which the stack manager copies virtual thread stacks from low memory to high memory.

7. The method of claim 1, copying the at least one unused stack from low memory to high memory further comprises:
determining ages of all stacks in low memory; and
responsive to a determination that any stack in low memory has an age above a predetermined threshold, copying that stack from low memory to high memory.

8. A system for hybrid virtual thread context switching, the system comprising:
a computer-readable storage medium that stores program instructions;
one or more processors operably connected to the computer-readable storage medium and configured to execute the program instructions to cause the system to:
responsive to preparation of scheduling a number of virtual threads to run on a virtual machine on a host system, determine whether a virtual thread requires a stack;
responsive to a determination that the virtual thread requires a stack, determine whether low memory has enough space to allocate a stack;
responsive to a determination that low memory has enough space, allocate a stack in low memory to the virtual thread;
responsive to a determination that low memory does not have enough space, copy at least one unused stack from low memory to high memory;
responsive to a determination that the virtual thread does not require a stack, determine whether a virtual thread stack is in low memory;
responsive to a determination that the virtual thread stack is not in low memory, determine whether there is enough space in low memory to copy the virtual thread stack from high memory into low memory;
responsive to a determination that there is enough space in low memory to copy the virtual thread stack from the high memory into low memory, copy the virtual thread stack from high memory to low memory;
responsive to a determination that there is not enough space in low memory to copy the virtual thread stack from high memory into low memory, copy at least one unused stack from low memory to high memory;
responsive to a determination that the virtual thread stack is in low memory, perform a stack switch for the virtual thread;
schedule the virtual thread on a carrier thread of the virtual machine; and
execute the carrier thread of the virtual machine.

9. The system of claim 8, wherein the virtual threads are scheduled at the virtual machine level.

10. The system of claim 8, wherein the program instructions that cause the system to perform the stack switch further cause the system to:
isolate parts of an internal runtime language required for executing code in the runtime language;
add the isolated parts to a continuation structure;
add a field for the continuation structure in a continuation object;
responsive to starting or resuming a continuation, swap contents of a carrier thread of the host system with contents of the continuation structure; and
responsive to yielding a continuation, swap the contents of the continuation structure with the contents of the carrier thread.

11. The system of claim 8, wherein the program instructions that cause the system to copy the virtual thread stack from high memory to low memory further cause the system to:
allocate a new stack in high memory;
record a difference between addresses of the new stack and an old stack as a delta to ensure specified stack slot alignment constraints are met;
perform a memory copy of the old stack to the new stack;
walk all stack frames on the old stack;
use the delta to update the stack frames to refer to the new stack;
update just-in-time decompilation records to refer to the new stack;
update stack overflow markers on the new stack; and
walk all object slots on the new stack to update all references to a stack allocated object on the old stack to point to the new stack using the delta.

12. The system of claim 8, wherein the program instructions that cause the system to copy the at least one unused stack from low memory to high memory further cause the system to:
wake a stack manager thread at predetermined intervals;
responsive to waking, increment the age of the stack in low memory;
calculate a sum of sizes of all virtual thread stacks in low memory;
responsive to a determination that the sum is below a specified threshold, direct the stack manager to sleep until a next predetermined interval; and
responsive to a determination that the sum exceeds the specified threshold, compute a number of threads to copy out of a predetermined memory threshold range.

13. The system of claim 12, wherein the program instructions that cause the system to compute the number of threads to copy out of a predetermined memory threshold range further cause:
walk a virtual threads list to determine oldest threads;
copy out top entries in a predetermined free threads amount;
determine, according to a specified reduction ratio, a number of low memory spaces to be freed by copying virtual thread stacks; and
responsive to a determination that an insufficient number of low memory spaces is to be freed by copy virtual thread stacks, increase a frequency at which the stack manager copies virtual thread stacks from low memory to high memory.

14. The system of claim 8, wherein the program instructions that cause the system to copy the at least one unused stack from low memory to high memory further cause the system to:
determine ages of all stacks in low memory; and
responsive to a determination that any stack in low memory has an age above a predetermined threshold, copy that stack from low memory to high memory.

15. A computer program product for hybrid virtual thread context switching, the computer program product comprising:
a persistent computer-readable storage medium having program instructions configured to cause one or more processors to:
responsive to preparation of scheduling a number of virtual threads to run on a virtual machine on a host system, determine whether a virtual thread requires a stack;
responsive to a determination that the virtual thread requires a stack, determine whether low memory has enough space to allocate a stack;
responsive to a determination that low memory has enough space, allocate a stack in low memory to the virtual thread;
responsive to a determination that low memory does not have enough space, copy at least one unused stack from low memory to high memory;
responsive to a determination that the virtual thread does not require a stack, determine whether a virtual thread stack is in low memory;
responsive to a determination that the virtual thread stack is not in low memory, determine whether there is enough space in low memory to copy the virtual thread stack from high memory into low memory;
responsive to a determination that there is enough space in low memory to copy the virtual thread stack from the high memory into low memory, copy the virtual thread stack from high memory to low memory;
responsive to a determination that there is not enough space in low memory to copy the virtual thread stack from high memory into low memory, copy at least one unused stack from low memory to high memory;
responsive to a determination that the virtual thread stack is in low memory, perform a stack switch for the virtual thread; schedule the virtual thread on a carrier thread of the virtual machine; and
execute the carrier thread of the virtual machine.

16. The computer program product of claim 15, wherein the instructions for performing the stack switch further comprise instructions to cause the processors to:
isolate parts of an internal runtime language required for executing code in the runtime language;
add the isolated parts to a continuation structure;
add a field for the continuation structure in a continuation object;
responsive to starting or resuming a continuation, swap contents of a carrier thread of the host system with contents of the continuation structure; and
responsive to yielding a continuation, swap the contents of the continuation structure with the contents of the carrier thread.

17. The computer program product of claim 15, wherein the instructions for copying the virtual thread stack from high memory to low memory further comprise instructions to cause the processors to:
allocate a new stack in high memory;
record a difference between addresses of the new stack and an old stack as a delta to ensure specified stack slot alignment constraints are met;
perform a memory copy of the old stack to the new stack;
walk all stack frames on the old stack;
use the delta to update the stack frames to refer to the new stack;
update just-in-time decompilation records to refer to the new stack;
update stack overflow markers on the new stack; and
walk all object slots on the new stack to update all references to a stack allocated object on the old stack to point to the new stack using the delta.

18. The computer program product of claim 15, wherein the instruction for copying the at least one unused stack from low memory to high memory further comprise instructions to cause the processors to:
wake a stack manager thread at predetermined intervals;
responsive to waking, increment the age of the stack in low memory;
calculate a sum of sizes of all virtual thread stacks in low memory;
responsive to a determination that the sum is below a specified threshold, direct the stack manager to sleep until a next predetermined interval; and
responsive to a determination that the sum exceeds the specified threshold, compute a number of threads to copy out of a predetermined memory threshold range.

19. The computer program product of claim 18, wherein instructions for computing the number of threads to copy out of a predetermined memory threshold range further comprise instructions to cause the processors to:
walk a virtual threads list to determine oldest threads;
copy out top entries in a predetermined free threads amount;
determine, according to a specified reduction ratio, a number of low memory spaces to be freed by copying virtual thread stacks; and
responsive to a determination that an insufficient number of low memory spaces is to be freed by copy virtual thread stacks, increase a frequency at which the stack manager copies virtual thread stacks from low memory to high memory.

20. The computer program product of claim 15, wherein the instruction for copying the at least one unused stack from low memory to high memory further instructions to cause the processors to:
determine ages of all stacks in low memory; and
responsive to a determination that any stack in low memory has an age above a predetermined threshold, copy that stack from low memory to high memory.

* * * * *